US012006087B1

(12) United States Patent
Heaslet et al.

(10) Patent No.: US 12,006,087 B1
(45) Date of Patent: Jun. 11, 2024

(54) LABEL REINFORCING DEVICE, AND RELATED SYSTEMS AND METHODS

(71) Applicant: Amazon Technologies, Inc., Seattle, WA (US)

(72) Inventors: William Curtis Heaslet, North Bend, WA (US); Shuangkai Wu, Watford (GB); Paolo Muccioli, Genoa (IT); Andrea Fagiani, Luxembourg (LU); Vishnu Mohan Mohanan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 17/735,745

(22) Filed: May 3, 2022

(51) Int. Cl.
*B65C 9/28* (2006.01)
*B65C 9/02* (2006.01)
*B65C 9/40* (2006.01)

(52) U.S. Cl.
CPC .................. *B65C 9/28* (2013.01); *B65C 9/02* (2013.01); *B65C 9/40* (2013.01); *B65C 2009/407* (2013.01)

(58) Field of Classification Search
CPC .... B65C 9/02; B65C 9/28; B65C 9/40; B65C 2009/407
See application file for complete search history.

(56) References Cited

U.S. PATENT DOCUMENTS 4,089,725 A * 5/1978 Crankshaw ............... B65C 9/42 156/562
5,954,913 A * 9/1999 Wurz .................... B65C 9/1884 156/360

* cited by examiner

*Primary Examiner* — George R Koch
(74) *Attorney, Agent, or Firm* — BakerHostetler

(57) ABSTRACT

A force applicator for reinforcing a label against a package includes a housing that defines an interior pneumatic chamber, an inlet that is in fluid communication with the pneumatic chamber and is connectable to a pressurized fluid supply, and at least one outlet in fluid communication with the pneumatic chamber. The at least one outlet faces an outlet direction. Additionally, the at least one outlet extends along a distribution direction and is arranged to distribute pressurized gas along the distribution direction. The at least one outlet is configured to expel the pressurized gas at sufficient force to press unadhered portions of a label against an underlying package.

19 Claims, 5 Drawing Sheets

LABEL REINFORCING DEVICE, AND RELATED SYSTEMS AND METHODS

TECHNICAL FIELD

The present invention relates to label applicators, particularly to label reinforcing applicators for rectifying misapplied labels, and more particularly for affixing unadhered portions of a label to the underlying package.

BACKGROUND

In a materials handling facility, such as an order fulfillment center, multiple customer orders are received, where each order specifies one or more items from inventory (which may also be referred to as stock storage) to be shipped to the customer that submitted the order. To fulfill the customer orders, a fulfillment center control system (also referred to herein as a "control system"), such as a type having a processor executing warehouse management software, can instruct operators regarding a location within the fulfillment center where the one or more items specified in each customer order is stored in inventory. Under direction of the control system, the one or more items can be retrieved or "picked" from inventory, singulated, and then inducted into a conveyance mechanism that routes the items to particular destinations, such as sorting stations, in accordance with the customer orders currently being processed. In this process, the control system assigns each picked item a unique identification that is associated with the customer order for which the item was picked. The control system instructs the conveyance mechanism and any human operator(s) therein to direct each picked and singulated item to a designated destination within the materials handling facility, such as to a designated sorting station where items are organized (such as into containers) into units of items based on their respective customer orders, and onward to an order processing station, such as a packing station.

At the packing station, units of items for customer orders are processed, packed, and labeled for shipping to the customers. For each package, a shipping label typically displays data, such as a shipment identification encoded in a barcode printed on the shipping label. In a native format, the shipment identification (also referred to herein as a "shipment ID") can be represented as a series of alphanumeric characters that are assigned by the control system and linked by the control system with order shipment information (such as the customer's name and delivery address) stored in computer memory accessible by the processor of the control system. The control system can also associate the shipment ID with additional order processing information, such as warehouse routing information for subsequent routing within the fulfillment center, as discussed further below.

Downstream of the packing station, the control system typically uses the encoded shipment ID (e.g., barcode data), to route the package along additional conveyance to further downstream processes and/or locations within the fulfillment center, such as to a staging destination associated with a particular delivery zip code. At the staging destination, the package can be palletized or otherwise bundled with other packages for loading onto a delivery vehicle for further delivery, such as to a shipping warehouse or to a public or private carrier for finally shipping the package to the customer address. The encoded shipment ID, which can include a five- or nine-digit zip code, for example, can also be scanned by the carrier(s) at one or more steps before, during, or at the conclusion of delivery to the customer. Such scans are typical in delivery processes or services that offer delivery tracking.

Because processes within the fulfillment center that are downstream of the packaging station (and possibly employed by the carrier) can rely upon the encoded shipment IDs for accurate package routing and delivery, it is important that the shipping labels adhere properly to their respective packages. It is also important for shipping labels to adhere properly to their respective packages because bent, folded, or otherwise misapplied labels can convey a negative perception to the customer and thus diminish customer experience and satisfaction.

BRIEF DESCRIPTION OF THE DRAWINGS

The following detailed description of illustrative embodiments of the present application, will be better understood when read in conjunction with the appended drawings. For the purposes of illustrating the features of the present application, there is shown in the drawings illustrative embodiments. It should be understood, however, that the application is not limited to the precise arrangements and instrumentalities shown. In the drawings:

FIG. 1A is a perspective view of a label exhibiting label curling on a planar package surface; FIG. 1B is a perspective view of a label exhibiting label curling on a convex package surface; FIG. 1C is a perspective view of a label exhibiting label dragging; FIG. 1D is a perspective view of a "flagged" (overhanging) label; and FIG. 1E is a perspective view of a label misapplied due to a pack taping error;

DETAILED DESCRIPTION OF ILLUSTRATIVE EMBODIMENTS

Figure 1A:
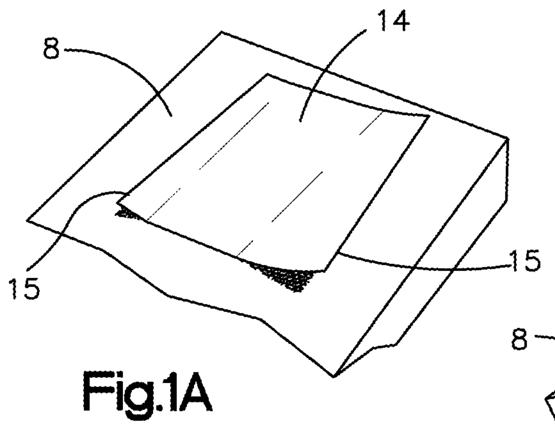
Fig.1A (PRIOR ART)
FIGS. 1A-1E illustrate various examples of label application errors that are correctable by the embodiments disclosed herein.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The terms "approximately," "about," and "substantially," as used herein with respect to dimensions, angles, ratios, and other geometries, takes into account manufacturing tolerances. Further, the terms "approximately", "about", and "substantially" can include 10% greater than or less than the stated dimension, ratio, or angle. Further, the terms "approximately", "about", and "substantially" can equally apply to the specific value stated.

It should be understood that, although the terms "first," "second," "third," etc. may be used herein to describe various elements, these elements should not be limited by these terms. These terms are instead used to distinguish one element from another. For example, a first element could be termed a second element, and, similarly, a second element could be termed a first element without departing from the scope of the embodiments disclosed herein.

The embodiments disclosed herein pertain to methods and instrumentalities for reinforcing labels that have been applied to objects (e.g., packages), particularly to such methods and instrumentalities for reinforcing (i.e., pressing) misapplied labels so that unadhered portions of the labels are thereby pressed and adhered to the associated package.

Misapplied labels often involve one or more portions of the label that adhere to the underlying package and one or more additional portions that are not adhered to the underlying package. In high-volume, high-throughput packaging systems, such as those in an order fulfillment center, misapplied labels tend to occur at higher rates with certain package types, such as soft (i.e., supple) packages and/or packages that have amorphous, rounded or other non-planar target surfaces. Examples of common modes of label misapplication are shown in FIGS. 1A-1E. It should be appreciated, however, that numerous other label misapplication modes can arise in a high-volume packing system.

Figure 1B:
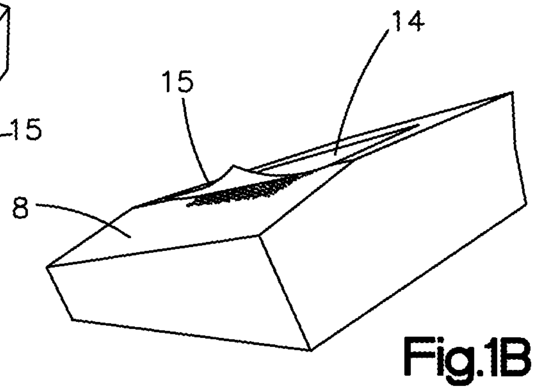
Fig.1B (PRIOR ART)

As shown in FIGS. 1A-1B, one mode of label misapplication includes "label curling," such that one or more edges 15 of the label 14 (e.g., the leading edge and/or trailing edge) curl away from the underlying package 8. This type of misapplication is more commonly associated with air-pillow type label tamps, and can occur on a planar target surface of the package 8, as shown in FIG. 1A. Label curling also occurs when the target package surface is rounded or otherwise convex, as shown in FIG. 1B.

Figure 1C:
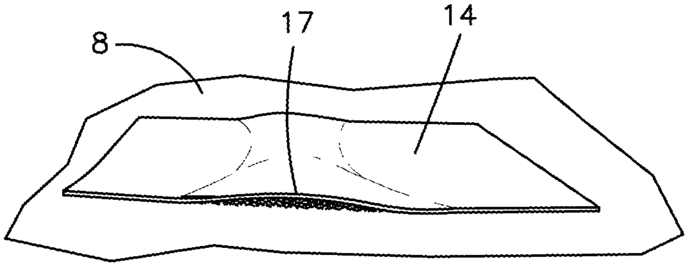
Fig.1C (PRIOR ART)

As shown in FIG. 1C, another mode of label misapplication includes "label dragging," which can be caused by the dragging action of a static or near-static label tamp across the surface of a moving package 8. Label dragging is often characterized by a middle wrinkle 17 in the label 14.

Figure 1D:
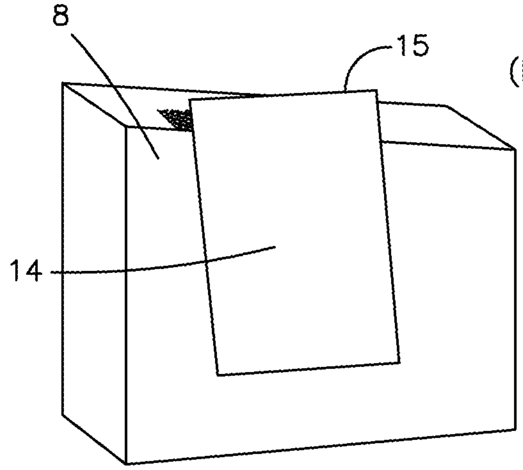
Fig.1D (PRIOR ART)

As shown in FIG. 1D, another mode of label misapplication includes overhanging or "flagged" labels 14, whereby a portion of the label 14 overhangs and edge of the package 8. Flagged labels 14 often result from a package 8 entering the tamp zone in one orientation, and being rotated (e.g., 90 degrees about a vertical axis) so that the target surface no longer fully underlies the tamp head.

Figure 1E:
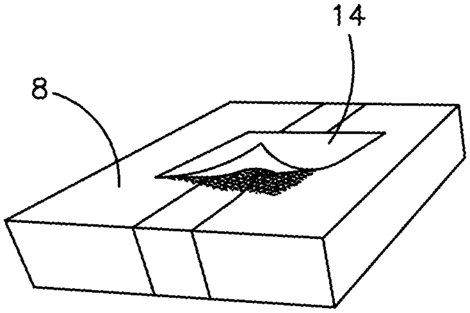
Fig.1E (PRIOR ART)

As shown in FIG. 1E, another mode of label misapplication is caused by a pack taping error, particularly when the tape on the package 8 was not properly pressed flat, and the label 14 was tamped to a region of protruding tape, thereby preventing the label from adhering fully.

The embodiments disclosed herein have been observed to press unadhered portions of a misapplied label into adhesion with the underlying package. These embodiments employ a label reinforcing device that is located downstream of the label applicator (e.g., tamp head) and directs pressurized gas toward the label with sufficient force that presses unadhered portions of the label against (and into adhesion with) the underlying package. The label reinforcing devices disclosed herein have been observed to rectify misapplied labels even when the underlying package surface is rounded or otherwise convex. The label reinforcing devices disclosed herein can be located downstream and adjacent the label applicator(s) for providing prompt reinforcement to misapplied labels, which can advantageously avoid numerous downstream problems that otherwise occur with mislabeled packages.

Figure 2:
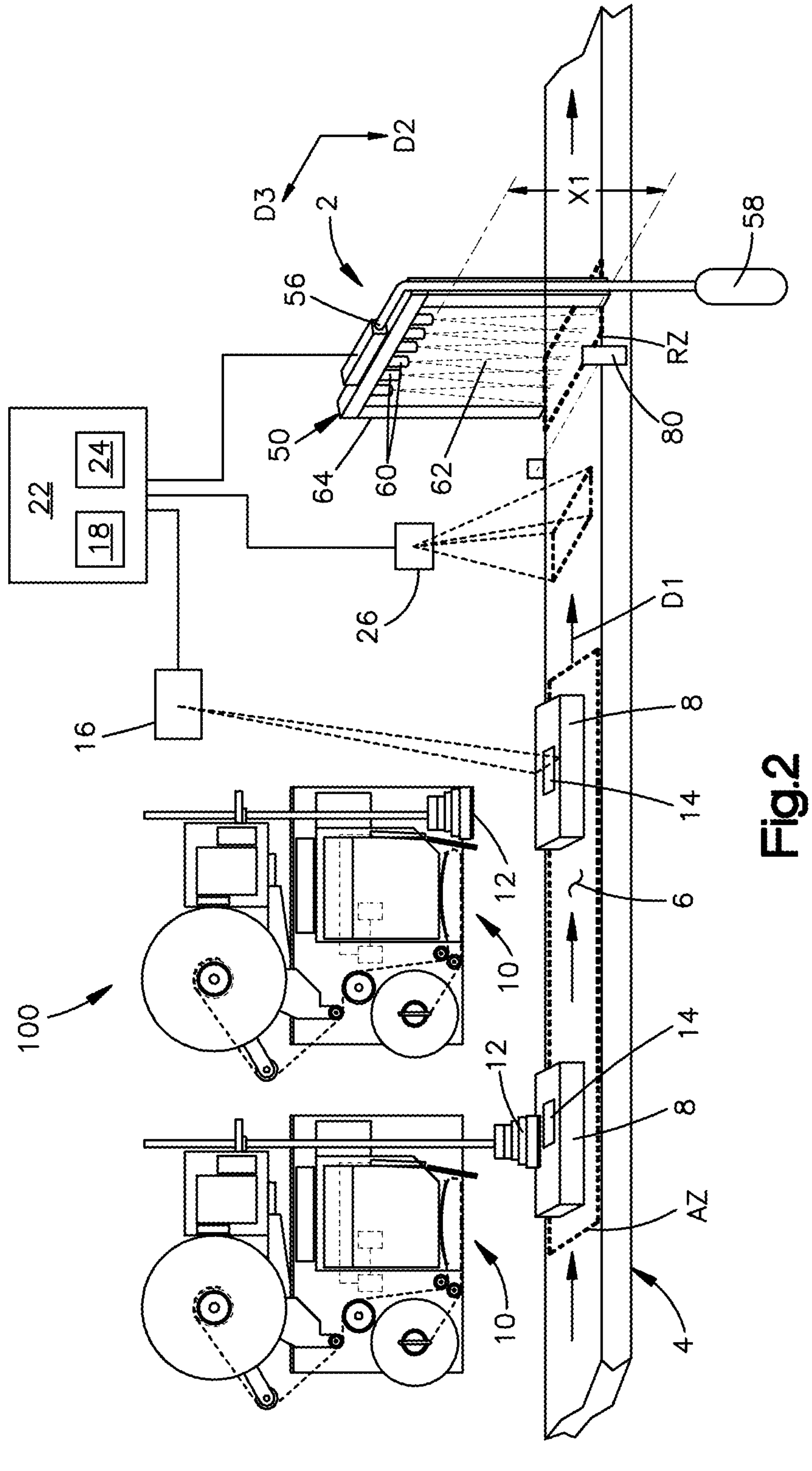
FIG. 2 is a perspective view of a labeling system that employs a label reinforcing device that employs cones or fans of pressurized gas for reinforcing label adhesion, according to an embodiment of the present disclosure.

Referring now to FIG. 2, an exemplary labeling system 100 is shown that employs a label reinforcing device 2. The labeling system 100 includes a conveyor 4 having a movable support surface 6 that is configured to convey packages 8 thereon in a conveyance direction D1. At least one label applicator 10 is positioned adjacent the conveyor along a label application zone AZ of the conveyor. The label applicators 10 of the illustrated embodiment each have a tamp head 12 configured to apply labels 14 to the packages 8 as the packages 8 are conveyed through the label application zone AZ. In the illustrated embodiment, the labeling system 100 employs two (2) label applicators 10 in series within the label application zone AZ. It should be appreciated, however, that the system 100 can employ a single label applicator 10 or more than two label applicators 10 in the label application zone AZ. The label reinforcing device 2 is positioned adjacent the conveyor 4 at a reinforcement zone RZ thereof, which is located downstream of the label applicator(s) 10 in the conveyance direction D1. The label reinforcing device 2 includes a force applicator 50 that is configured to direct pressurized gas (e.g., air) against packages 8 as they traverse (i.e., pass through) the reinforcement zone RZ. In particular, the force applicator 50 directs the pressurized gas against packages 8 at a force sufficient to press unadhered portions of a label 14 against the package 8 to which a part of the label 14 is adhered, as described in more detail below. To achieve the sufficient force, the force applicator 50 is preferably configured to expel pressurized gas at a pressure in a range of about 1 atm to about 5 atm.

It should be appreciated, however, that other pressure ranges are within the scope of the present disclosure.

The labelling system 100 can include an optical scanning unit 16, which can include a barcode scanner for scanning encoded data on the applied labels, such as encoded shipment IDs (e.g., barcode data, such as linear barcodes, matrix barcodes (e.g., QR codes), and 3D or "textured" barcodes). The optical scanning unit 16 is preferably located along the conveyor 4 downstream from, and proximate to, the label applicator(s) 10. Data from the optical scanning unit 16 is analyzed by a processor 18, which interprets the data for various purposes, such as to track packages within a packaging system and/or verify whether the encoded data on the labels is sufficiently accurate and/or machine-readable within system parameters, by way of non-limiting examples. The optical scanning unit 16 can include one or more additional optical sensors, such as camera(s), complementary metal-oxide-semiconductor (CMOS) image sensor(s), charge-coupled devices (CCDs), and the like. Data from the optical sensor(s) is analyzed by the processor 18 for various purposes, such as for identifying package types, sizes, and orientations and label orientations departing the label application zone AZ. In the illustrated embodiment, the processor 18 is part of an electronic control unit 22 that controls various components and functions of the labelling system 100. The processor 18 is in communication with computer memory 24 and is configured to execute computer readable instructions stored in the computer memory for performing the various controls, examples of which are described in more detail below.

The force applicator 50 includes a housing 52 that defines an interior pneumatic chamber 54 (see FIGS. 3B-3D) and an inlet 56 in fluid communication with the pneumatic chamber 54. The inlet 56 is connectable to a pressurized fluid supply 58, such as a tank 58 containing compressed air, for supplying the pressurized gas to the pneumatic chamber 54. The housing 52 includes at least one outlet 60 in fluid communication with the pneumatic chamber 54. The at least one outlet 60 faces an outlet direction D2 that intersects the support surface 6 in the reinforcement zone RZ. The at least one outlet 60 is configured to expel pressurized gas 62 from the pneumatic chamber 54 in the outlet direction D2 toward the packages 8 on the support surface 6. The outlet direction D2 can be vertically downward, as shown, although in other embodiments the outlet direction D2 can have a directional component that is horizontal.

The force applicator 50 is attachable to a mounting structure 64 (also referred to herein as a "mount" 64) that is operatively connectable to the conveyor 4. The mount 64 is configured to position the force applicator 50 at a distance X1 measured between the at least one outlet 60 and the support surface 6 in the outlet direction D2. As shown, the mount 64 can include bracket arms that couple with the force applicator 50 and also attach to the conveyor 4 at a select location thereof. Additional mount 64 configurations are discussed in more detail below.

In the illustrated embodiment, the at least one outlet 60 includes a plurality of outlets 60 that face the outlet direction D2 and are each configured to expel a cone or fan of pressurized gas toward the support surface 6 in the reinforcement zone RZ. The plurality of outlets 60 are arranged or otherwise distributed along a distribution direction D3, which, in the illustrated example, is substantially horizontal and perpendicular to the conveyance direction D1 and the outlet direction D2. For example, the plurality of outlets 60 can be arranged in a single row that extends along the distribution direction D3, as shown. The plurality of outlets 60 are configured to provide an array of cones or fans of pressurized gas that are distributed along the distribution direction D3 and provide a field of application forces substantially in the outlet direction D2, as described in more detail below. In this outlet 60 configuration, the array of pressurized gas cones or fans can be characterized as an air curtain or ribbon. It should be appreciated that the pressurized gas expelled from an outlet 60 can be referred to herein synonymously as a cone, fan, spray, jet, plume, stream, and other like terms. It should also be appreciated that the outlet 60 arrangement shown in FIG. 2 represents one example of the various outlet arrangements that are within the scope of the present disclosure. Additional example outlet 60 arrangements will be described below.

Figure 3A:
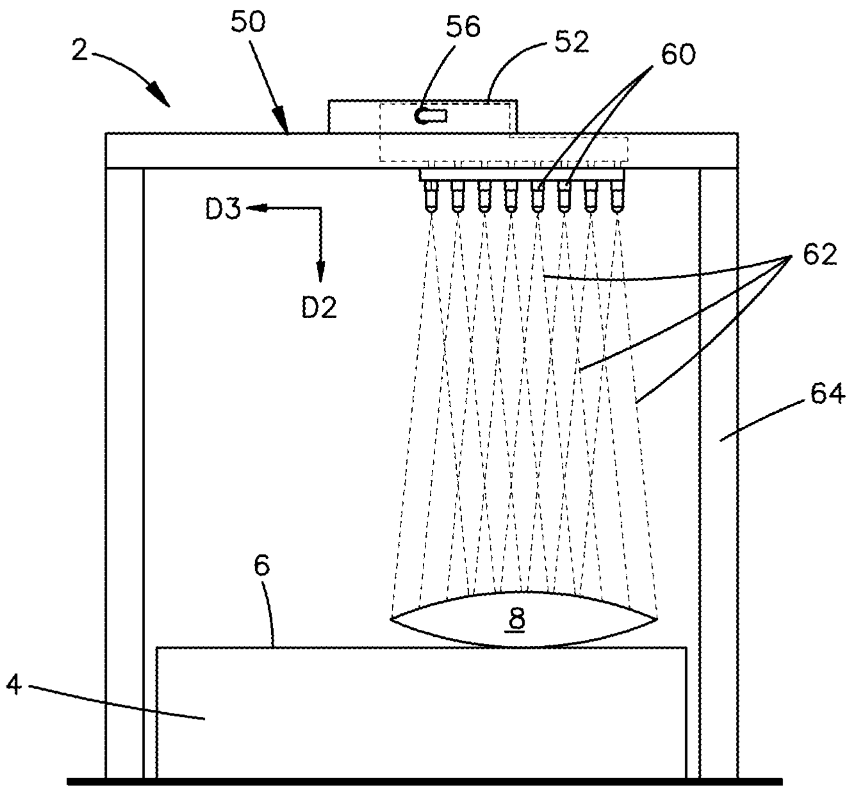
FIG. 3A is a front plan view of a label reinforcing device similar to that shown in FIG. 2, according to an embodiment of the present disclosure.
Figure 3B:
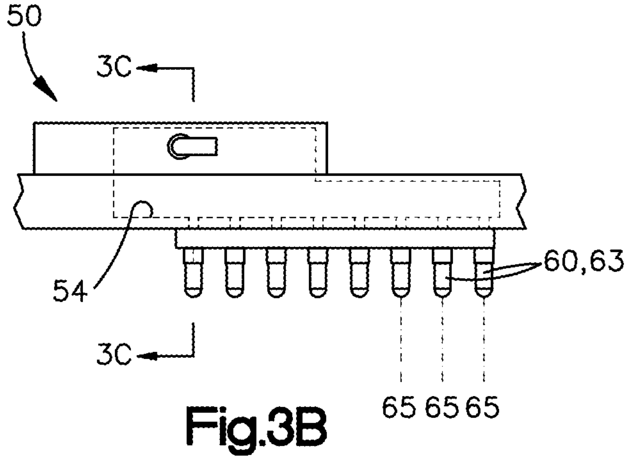
FIG. 3B is an enlarged portion of the label reinforcing device illustrated in FIG. 3A.

Referring now to FIGS. 3A-3B, the force applicator 50 can be positioned by the mount 64 so that the force actuator 50 extends transversely across the support surface 6 of the conveyor 4. The housing 52 of the force applicator 50 defines the pneumatic chamber 54 that is in fluid communication with the outlets 60. In the illustrated example, the housing 52 defines a manifold that defines the outlets 60.

Figure 3C:
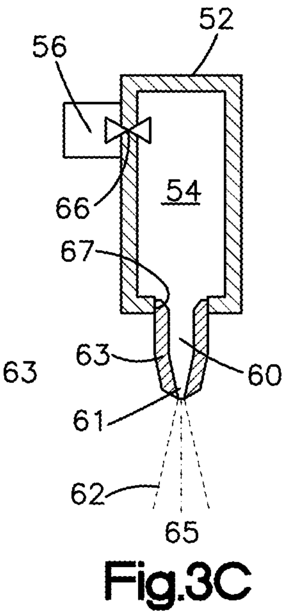
FIG. 3C is a sectional end view of the label reinforcing device taken along section line 3C-3C in FIG. 3B.

The outlets 60 can be collectively actuated to expel pressurized gas therefrom. For example, as shown in FIG. 3C, the force applicator 50 can include a valve 66 interposed between the inlet 56 and the pneumatic chamber 54. In such embodiments, the valve 66 can be actuated between an open position, in which pressurized gas from the supply 58 enters the pneumatic chamber 54 and is expelled through the outlets, and a closed position, in which pressurized gas is occluded from entering the pneumatic chamber and is thus not expelled from the outlets 60.

Figure 3D:
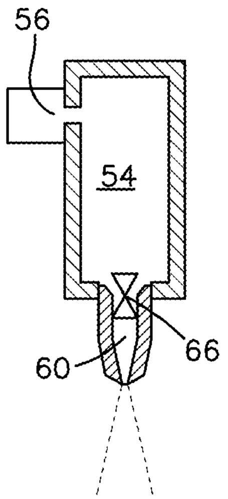
FIG. 3D is a sectional end view of the label reinforcing device according to another embodiment of the present disclosure.

In other embodiments, the outlets 60 can be individually actuated to expel pressurized gas therefrom independently. For example, as shown in FIG. 3D, each outlet 60 can have an associated valve 66. In this manner, the force applicator 50 can include a plurality of valves 66 that are interposed between the pneumatic chamber 54 and the respective outlets 60. The valves 66 can be independently actuated between their open and closed positions, thereby allowing each outlet 60 to independently expel pressurized gas therefrom. This selective actuation of various ones of the valves 66 can be employed as needed to direct a tailored distribution of pressured gas against a label 14 traversing the reinforcement zone RZ. In this manner, the distribution of pressurized gas can be adjusted based upon, e.g., the type of label misapplication for correction and the expected path that the unadhered label region(s) will traverse through the reinforcement zone RZ. Stated differently, such individually controllable valves 66 allow the force applicator 50 to direct label-specific force distributions against misapplied labels.

Preferably each of the outlets 60 comprises a nozzle orifice 61 at a distal end thereof, which is configured for expelling the pressurized gas therefrom in a directed cone centered along an outlet axis 65. The nozzle orifice 61 geometry and dimensions can be selected based on various factors, such as the desired cone/fan angle of the cone, cone spray pattern (i.e., the cone cross-sectional shape as viewed in a reference plane orthogonal to the outlet axis 65), and fluid expulsion velocities based on chamber pressures, by way of non-limiting examples. The outlets 60 and their nozzle orifices 61 are preferably defined by respective nozzle bodies 63, which can be removably attached to the manifold 52 at respective outlet mounts 67. In this manner, the nozzle bodies 63 can be interchangeable with different nozzle bodies 63 providing different fluid expulsion characteristics. Thus, the force applicator 50 can be retrofitted with different nozzle bodies 63 to adjust the fluid distribution characteristics of the device 2.

Referring now to FIGS. 4A-4F, alternative outlet 60 arrangements will now be described. It should be appreciated that these alternative outlet 60 arrangements are provided as non-limiting examples of various outlet arrangements that are within the scope of the present disclosure.

Figure 4A:
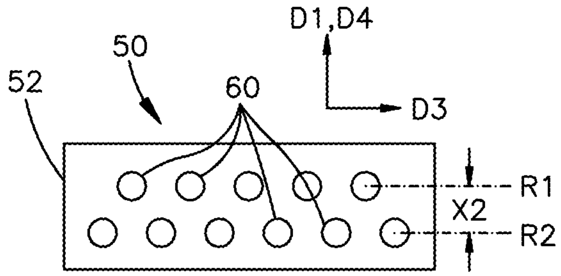
FIG. 4A is a bottom plan view of an outlet configuration of a label reinforcing device, according to an embodiment of the present disclosure.
Figure 4B:
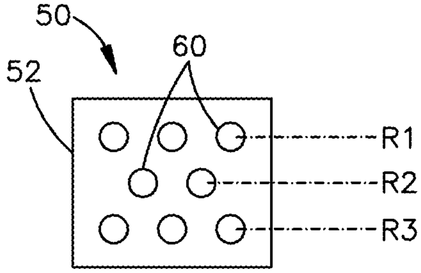
FIG. 4B is a bottom plan view of another outlet configuration of a label reinforcing device, according to an embodiment of the present disclosure.
Figure 4C:
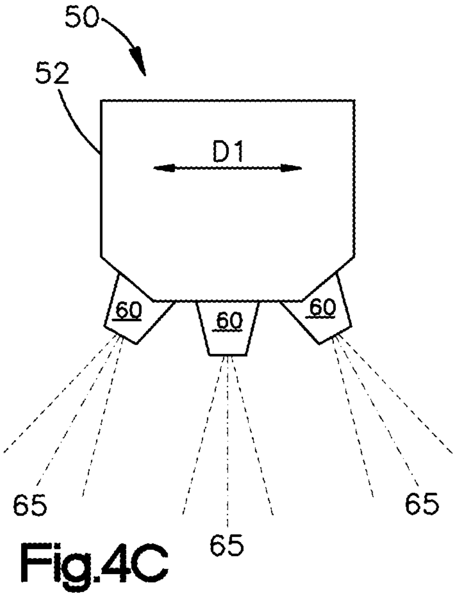
FIG. 4C is a side plan view of an additional outlet configuration of a label reinforcing device, according to an embodiment of the present disclosure.

With reference to FIGS. 4A-4C, respective force applicators 50 can have manifolds 52 having multiple rows (R1, R2, etc.) of outlets 60 for further distributing pressurized gas along a second distribution direction D4, which can also be referred to as an "offset direction" D4. As shown in FIG. 4A, the force applicator 50 can have a manifold 52 that includes a first plurality of outlets 60 arranged along a first row R1 and a second plurality of outlets 60 arranged along a second row R1. The first and second rows R1, R2 are spaced from each other at a spacing distance X2 along the offset direction D4, which in the illustrated example is perpendicular to the distribution direction D3. In such multi-row embodiments, the distribution direction D3 can be referred to as the "first distribution direction" D3. In the present example, the second distribution direction D4 is substantially parallel with the conveyance direction D1. As shown in FIG. 4B, the manifold 52 can include first, second, and third rows R1, R2, R3 of outlets 60, which rows are spaced from each other along the second distribution direction D4. As shown in FIG. 4C, the outlets 60 can be arranged into multiple rows, such as first, second, and third rows R1, R2, R3, such that the outlets 60 of each row define outlet axes 65 that are angularly offset from the outlet axes 65 of the other rows. In this manner, the outlets 60 can provide a force distribution that "fans" forwardly and rearwardly with respect to the conveyance direction D1.

Figure 4D:
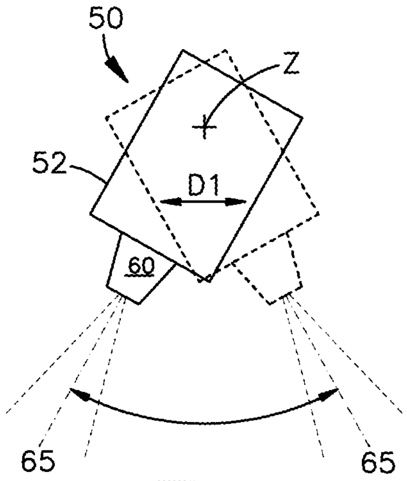
FIG. 4D is a side plan view of rotatable label reinforcing device, according to an embodiment of the present disclosure.

In additional embodiments, the manifold 52 can be configured to pivot, thereby allowing the outlets 60 to rotate for further tailoring the force distribution. For example, as shown in FIG. 4D, the manifold 52 can be configured to pivot about a pivot axis Z oriented along the distribution direction D3, thereby allowing the outlets 60 to rotate, so as to follow a package through the reinforcement zone RZ. In this manner, the outlets 60 can pivot as needed, such as for rectifying a leading edge label error, a trailing edge label error, and/or a label having leading and trailing edge errors. In other embodiments, the manifold 52 can be configured to pivot about a pivot axis that is offset from the distribution direction, such as a pivot axis that is orthogonal to the support surface 6 or a pivot axis that is oriented along the conveyance direction D1. In yet other embodiments, one or more of the outlets 60 can be configured to rotate, such as about their respective outlet axes 65. This mode of outlet rotation can be particularly useful when the respective outlets 60 expels a pressurized gas cone having an elongated (non-circular) spray pattern. The foregoing modes of outlet 60 pivoting/rotation can allow the outlets 60 to adjust the force distribution as needed to reinforce various types of misapplied labels.

Figure 4E:
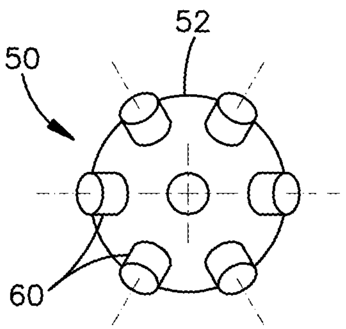
FIG. 4E is a bottom plan view of yet another outlet configuration of a label reinforcing device, according to an embodiment of the present disclosure.

In further embodiments, as shown in FIG. 4E, the manifold 52 can have a plurality of outlets 60 having outlet axes 65 that fan outwardly, such as from a central location or one or more non-central locations of the manifold 52. In this manner, the outlets 60 can collectively provide a fanned or conical force distribution for reinforcing labels. In such embodiments, the manifold 52 can also include one or more outlets 60 directed orthogonally toward the support surface 6. In the illustrated example, the manifold 52 includes a central outlet 60 that faces orthogonally toward the support surface 6, and the remaining outlets 60 fan outwardly from the central outlet 60.

It should be appreciated that the force applicators 50 can employ various additional and/or alternative outlet 60 configurations, including combinations of the illustrated configurations described herein, while remaining within the scope of the present disclosure.

Figure 4F:
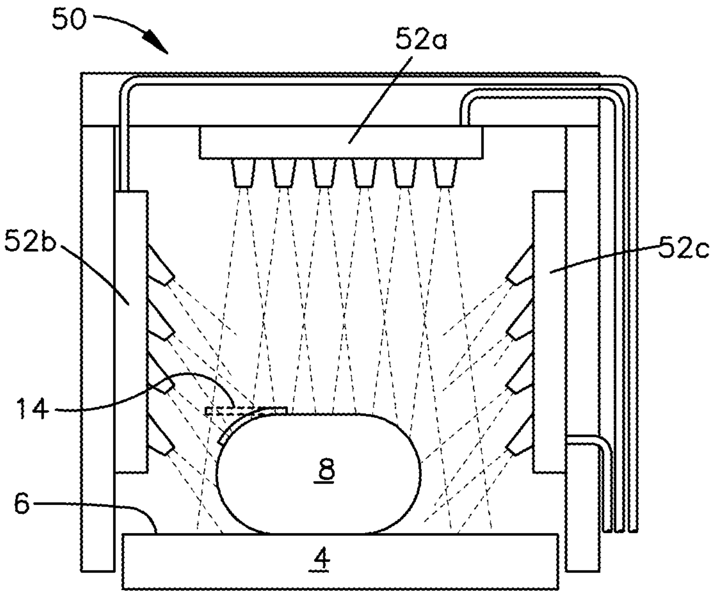
FIG. 4F is a front plan view a label reinforcing device that employs multiple force applicators arranged at different orientations, according to an embodiment of the present disclosure.

In further embodiments, as shown in FIG. 4F, the force applicator 50 can include multiple manifolds 52, each having a plurality of outlets 60. For example, the force applicator 50 can include a first manifold 52*a* having a first plurality of outlets that are distributed transversely across the conveyor 4. The force applicator 50 can also include a second manifold 52*b* having a second plurality of outlets 60 and a third manifold 52*c* having a third plurality of outlets 60. Each manifold 52*a-c* can have a respective supply tube for delivering pressurized gas to the respective manifold 52*a-c*. In the illustrated example, the second and third manifolds 52*b*, 52*c* are vertically elongate such that their respective outlets 60 are distributed vertically. Additionally, the outlets of the second and third pluralities manifolds 52*b*, 52*c* can be angled so as to eject pressurized gas downwardly at an acute angle relative to the support surface 6. In this manner, the second and third pluralities of outlets 60 can be particularly useful for reinforcing overhung or flagged labels 14 that are oriented so that overhung portions are laterally offset from the conveyance direction D1. It should be appreciated that one or more of the first, second, and third manifolds 52*a-c* can also be configured to pivot forwardly or rearwardly with respect to the conveyance direction D1, such as for rectifying leading or trailing overhung label portions, by way of a non-limiting example.

Figure 5A:
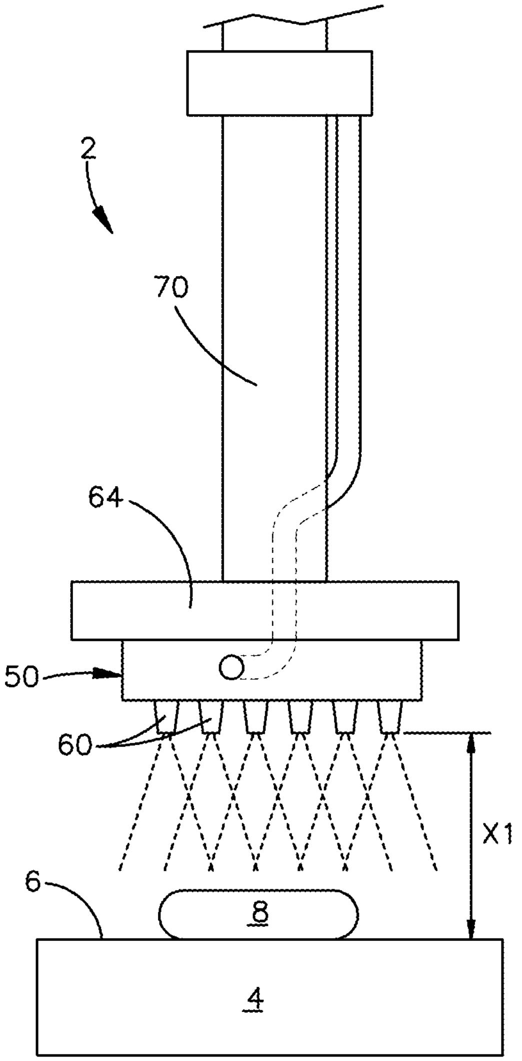
FIGS. 5A and 5B are front plan views of a label reinforcing device mounted to an actuator for adjusting a distance between the label reinforcing device and an underlying conveyor surface.
Figure 5B:
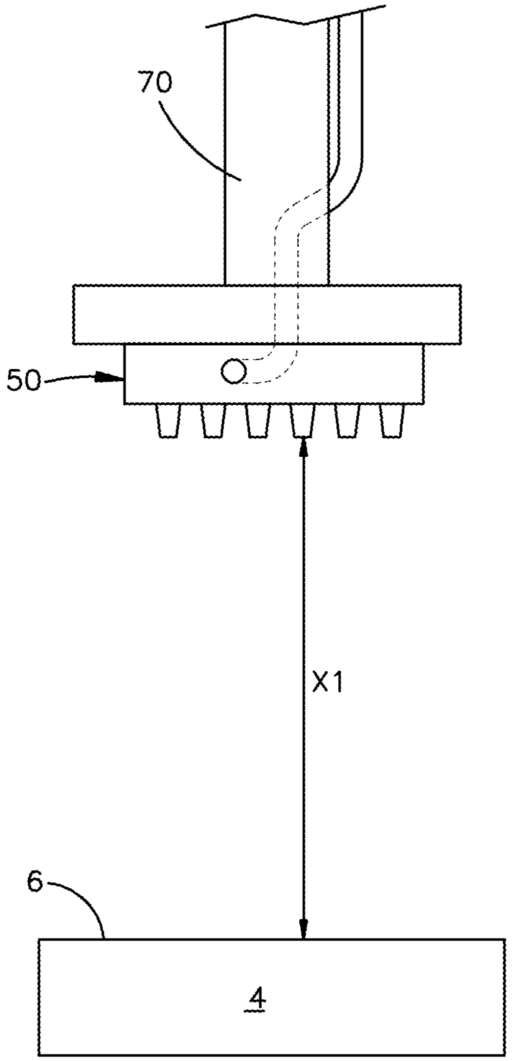

Referring now to FIGS. 5A-5B, an embodiment of the label reinforcing device 2 is shown where the force applicator 50 is movable along the outlet direction D2 for adjusting the distance X1 between the outlets 60 and the support surface 6. during use between a neutral position (FIG. 5B), in which the force applicator 50 is remote from the support surface 6, and a deployed position (FIG. 5A), in which the force applicator 50 is adjacent the support surface 6 at a proximity allowing the outlets 60 to provide sufficient force to press unadhered portions of labels 14 against the underlying package 8. In such embodiments, the mount 64 is connected to an actuator 70 that is movable with respect to the support surface 6, such as along the outlet direction D2, for adjusting the distance X1 between the outlets 60 and the support surface 6. In such embodiments, the actuator 70 can adjust the distance X1 as needed based on the height of the packages 8 traversing the reinforcement zone RZ. Additionally, the actuator 70 can adjust the distance X1 based on the type and orientation of misapplied labels 14 as they traverse the reinforcement zone RZ. Additionally or alternatively, the actuator 70 can iterate the force applicator 50 between a first position, such as a deployed position, such as that shown in FIG. 5A, and a second position, such as a neutral position, such as that shown in FIG. 5B. In this manner, the force applicator 50 can be maintained in a neutral, remote position until a misapplied label is identified. The actuator 70 can include a linear actuator, such as a screw drive, a hydraulic actuator, a pneumatic actuator, and/or a set of telescoping tubes, by way of non-limiting examples. It should be appreciated that various other mechanisms for moving the force applicator 50 during use are within the scope of the present disclosure.

Referring again to FIG. 2, the labelling system 100 can be configured to employ image recognition techniques for identifying misapplied labels 14. In such embodiments, the electronic control unit 22 can optionally be programmed to activate the label reinforcing device 2 when a misapplied label 14 is identified and to deactivate the label reinforcing device 2 when misapplied labels 14 are not detected. As shown, the labelling system 100 can include at least one image sensor 26 for viewing the applied labels 14 and for detecting misapplied labels 14 departing from the label application zone AZ. In the illustrated embodiment, one such image sensor 26 is positioned above the conveyor 4 and is oriented to view the labels 14 on the packages 8 on the support surface 6 of the conveyor 4 as the packages 8 move downstream from the label application zone AZ along the conveyance direction D1 toward the reinforcement zoned RZ. In the illustrated embodiment, the image sensor 26 is located between the label applicator(s) 10 and the force applicator 50. It should be appreciated that the image sensor 26 can be located elsewhere so long as the image sensor 26 can view the labels 14 on the packages 8 as they move toward the force applicator 50. The image sensor 26 can be a video camera, a complementary metal-oxide-semiconductor (CMOS) image sensor, or a charge-coupled device (CCD), by way of non-limiting examples. The image sensor 26 is in electrical communication with the processor 18 for transmitting image data to the processor 18. The processor 18 executes computer readable instructions, such as image recognition algorithms, which are configured for identifying misapplied labels 14. It should be appreciated that the image recognition algorithms can employ artificial intelligence, such as machine learning, to enhance the speed and accuracy at which misapplied labels 14 are identified and categorized.

It should also be appreciated that the labelling system 100 can additionally or alternatively employ image data obtained by the optical scanning unit 16 for identifying and categorizing misapplied labels 14. In such embodiments, the optical scanning unit 16 can be employed as a primary label image acquisition device and the image sensor 26 can be employed as a secondary or supplemental image acquisition device used for controlling operation of the label reinforcing device 2. Alternatively, the image sensor 26 can be the primary and the optical scanning unit 16 can be the secondary label image acquisition device. In yet other embodiments, either the image sensor 26 or the optical scanning unit 16 can be the sole label image acquisition device used for identifying and categorizing misapplied labels 14. When the optical scanning unit 16 is used for acquiring image data pertaining to label misapplication, the computer memory 24 can store computer readable interface instructions that adapt the image data from the optical scanning unit 16 for controlling operation of the label reinforcing device 2.

The processor 18 is also preferably configured to identify when a mislabeled package 8 enters or approaches the reinforcement zone RZ. For example, as shown in FIG. 2, the processor 18 can be in electronic communication with a proximity sensor 80, such as a motion detector, laser sensor, or the like, positioned at or near the upstream end of the reinforcement zone RZ. Additionally or alternatively, the processor 18 can be configured to calculate the expected time at which the misapplied labels 14 will traverse the reinforcement zone RZ based in-part on acquired image data (e.g., from the image sensor 26 and/or the optical scanning unit 16) and in-part on other known or sensed parameters, such as the velocity of the support surface in the conveyance direction D1. The processor 18 is preferably further configured to coordinate actuation of the label reinforcing device 2 to coincide with the label traversing the reinforcement zone RZ. In this manner, the force actuator 50 can be "timed" (e.g., synchronized with the conveyor 4) to expel pressurized gas directly against the misapplied labels 14 for providing optimal adhesion of the misapplied portions of the labels 14.

The processor 18 is preferably further configured to execute computer readable instructions (e.g., control algorithms) for controlling movement of the force applicator 50 and the and/or the outlets 60 thereof. For example, the processor 18 can be configured to execute control algorithms for tailoring the applied force of the pressurized gas responsive to (i.e., based upon) the detected characteristics of the misapplied labels, such as the type of label misapplication and/or the position and orientation of the misapplied label.

By employing the instrumentalities and techniques described above, the system 100 can be configured, under control of the processor 18, to identify and categorize the type of label misapplications and to responsively adjust one or more characteristics of the expelled pressurized gas for tailoring the applied force responsively to (i.e., based upon) the specific characteristics of the misapplied labels. For example, when employed with force applicators 50 having independently controllable outlets 60 (e.g., via independently controllable valves 66) the processor 18 can open select ones of the outlet valves 66 so as to direct a tailored distribution of pressurized gas against the label 14. When employed with outlets 60 that are movable (such as in embodiments where the manifold 52 is pivotable about a pivot axis and/or the outlets 60 themselves are rotatable), the processor 18 can additionally or alternatively move the force applicators 50 and/or outlets 60 as needed to adjust the distribution of pressurized gas against the label 14 as the label traverses the reinforcement zone RZ. By employing these various adjustable features of the label reinforcing device 2, the distribution of pressurized gas (e.g., the shape, orientation, and force magnitude) can be tailored to rectify label-specific and package-specific label misapplication errors.

Exemplary methods of using the label reinforcing device 2 will now be described. It should be appreciated that these methods are provided as non-limiting examples of use. A method of applying labels to packages includes a step of conveying packages 8 upon a support surface 6 in a conveyance direction D1; a step of applying labels 14 to the packages 8 with a label applicator 10 as the packages 8 are conveyed adjacent the label applicator 14; and, after the applying step, conveying the packages 8 upon the support surface 6 to a reinforcement zone RZ adjacent a force applicator 50. The force applicator 50 includes a housing 52 defining an interior pneumatic chamber 54, an inlet 56 in fluid communication with a pressurized fluid supply 58 and with the pneumatic chamber 54, and at least one outlet 60 that is in fluid communication with the pneumatic chamber 54 and faces an outlet direction D2. The method includes a step of expelling pressurized gas from the at least one outlet 60 at sufficient force in the reinforcement zone RZ to press unadhered portions of a label 14 against an underlying package 8 to which part of the label 14 is adhered.

In additional examples, the force applicator 50 is attached to a mount 64, and the method includes a step of positioning the mount 64 to position the force applicator 50 at a distance X1 measured between the at least one outlet 60 and the support surface 6 in the outlet direction D2. The method can further include moving an actuator 70 connected to the mount 64, thereby adjusting the distance X1.

In further examples, the method includes a step of obtaining images of the packages 8 at a location between the label applicator 10 and the force applicator 50 via an image sensor, wherein the image sensor is in electrical communication with a processor 18 in electronic communication with computer memory 24. The method includes a step of executing, by the processor 18, computer readable instructions stored in the computer memory 24. The executing step includes: a sub-step of performing image recognition that identifies misapplied labels 14 that are partially adhered to the associated packages 8, another sub-step of calculating a time duration at which an associated package 8 will traverse the reinforcement zone RZ, and an additional sub-step of actuating the force applicator 50 to expel the pressurized gas from the at least one outlet 60 while the associated package 14 is in the reinforcement zone RZ.

In yet additional examples of the foregoing methods, the at least one outlet 60 can include a plurality of outlets 60.

In some examples of such methods involving a plurality of outlets, the force applicator 50 includes a plurality of valves 66 positioned between the pneumatic chamber 54 and the respective outlets 60, and the executing step comprises adjusting the valves 66 independently for controlling a distribution of the pressurized gas expelled from the force applicator 50.

In further examples of such methods involving a plurality of outlets 60, the executing step comprises rotating the force applicator 50 about an axis Z that is perpendicular to the conveyance direction D1, thereby adjusting a distribution of the pressurized gas expelled from the force applicator 50.

In yet additional examples of such methods involving a plurality of outlets 60, the step of performing image recognition comprises a step of identifying a type of label misapplication, and the step of actuating the force applicator 50 comprises a step of moving at least some of the outlets 60 relative to the support surface 6 responsive to the type of label misapplication identified, thereby adjusting a distribution of the pressurized gas expelled from the force applicator 50 to reinforce the type of misapplied label 14.

It should be appreciated that various additional and/or alternative steps can be employed in methods of using the label reinforcing device 2 to reinforce misapplied labels.

It should be appreciated that the various embodiments, elements, features, instrumentalities, processes, techniques, and parameters of the labelling system 100, label reinforcing devices 2, force applicators 50, and constituent and supporting components thereof, as described above, are provided as exemplary embodiments, elements, features, instrumentalities, processes, techniques, and parameters for reinforcing misapplied labels, and can be adjusted as needed without departing from the scope of the present disclosure.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. In particular, one or more of the features from the foregoing embodiments can be employed in other embodiments herein. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. A label reinforcing device for location in a packaging system at a position that is downstream from a label applicator, comprising:

a conveyor having a support surface configured to convey labeled packages thereon in a conveyance direction;

a force applicator comprising:

a housing defining an interior pneumatic chamber;

an inlet in fluid communication with a pressurized fluid supply and with the pneumatic chamber; and at least one outlet in fluid communication with the 3*r* pneumatic chamber, wherein the at least one outlet faces an outlet direction, wherein the force applicator is mountable with respect to the conveyor such that the outlet direction intersects the support surface, and the force applicator is configured to expel pressurized gas from the at least one outlet at sufficient force to press unadhered portions of a label against an underlying package to which part of the label is adhered; and an image sensor in electrical communication with a processor that is in electronic communication with computer memory, wherein the image sensor is configured to obtain images of the package at a location upstream from the force applicator, and the processor is configured to execute computer readable instructions stored in computer memory to thereby perform image recognition for identifying one or more misapplied labels that are partially adhered to the package, the processor is also configured to execute the computer readable instructions for calculating a time duration at which the package will intersect the outlet direction, and the processor is further configured to execute the computer readable instructions for actuating the force applicator to expel the pressurized gas from the at least one outlet while the package intersects the outlet direction.

2. The label reinforcing device of claim 1, wherein the at least one outlet of the force applicator comprises a plurality of outlets.

3. The label reinforcing device of claim 2, wherein at least some of the plurality of outlets are spaced from each other along a distribution direction that is offset from the conveyance direction.

4. The label reinforcing device of claim 3, wherein the distribution direction is substantially perpendicular to the conveyance direction.

5. The label reinforcing device of claim 1, further comprising a mount that is operatively connectable to the conveyor, wherein the force applicator is attachable to the mount, and the mount is configured to position the force applicator at a distance measured between the at least one outlet and the support surface in the outlet direction.

6. The label reinforcing device of claim 5, wherein the mount is connected to an actuator that is movable with respect to the support surface along the outlet direction for adjusting the distance.

7. A force applicator for reinforcing a label against a package, comprising:

a pneumatic chamber;

an inlet in fluid communication with the pneumatic chamber, wherein the inlet is connectable to a pressurized fluid supply; and at least one outlet in fluid communication with the pneumatic chamber, the at least one outlet facing an outlet direction, the at least one outlet extending along a distribution direction, wherein the at least one outlet is arranged to distribute pressurized gas along the distribution direction and is configured to expel the pressurized gas at sufficient force to press unadhered portions of a label against an underlying package to which part of the label is adhered, wherein the force applicator is in electrical communication with an image sensor, a processor, and computer memory, wherein the image sensor is configured to obtain images of the package at a location upstream from the force applicator, and the processor is configured to execute computer readable instructions stored in computer memory to thereby perform image recognition for identifying one or more misapplied labels that are partially adhered to the package, the processor is also configured to execute the computer readable instructions for calculating a time duration at which the package will intersect the outlet direction, and the processor is further configured to execute to the computer readable instructions for actuating the force applicator to expel the pressurized gas from the at least one outlet while the package intersects the outlet direction.

8. The force applicator of claim 7, wherein the at least one outlet comprises a plurality of outlets spaced from each other along the distribution direction, and the pneumatic chamber comprises a manifold that defines the plurality of outlets.

9. The force applicator of claim 8, wherein the at least one outlet further comprises a second plurality of outlets that are spaced from each other and are defined by the manifold, and the second plurality of outlets is spaced from the plurality of outlets along an offset direction that is offset from the distribution direction.

10. The force applicator of claim 8, further comprising a valve interposed between the inlet and the pneumatic chamber, wherein the valve is adjustable between an open position, in which the plurality of outlets expel the pressurized gas at the sufficient force, and a closed position, in which the pressurized gas is not expelled from the plurality of outlets at the sufficient force.

11. The force applicator of claim 8, further comprising a plurality of valves positioned respectively at the plurality of outlets, wherein the valves of the plurality of valves are each adjustable between an open position, in which the plurality of outlets expel the pressurized gas at the sufficient force, and a closed position, in which the pressurized gas is not expelled from the plurality of outlets at the sufficient force.

12. The force applicator of claim 11, wherein the plurality of valves are independently controllable between the respective open and closed positions, such that the plurality of outlets are independently controllable for expelling the pressurized gas at the sufficient force.

13. A method of applying labels to packages, comprising:

conveying packages upon a support surface in a conveyance direction;

applying labels to the packages with a label applicator as the packages are conveyed adjacent the label applicator;

after the applying step, conveying the packages upon the support surface to a reinforcement zone adjacent a force applicator, the force applicator comprising:

a housing defining an interior pneumatic chamber;

an inlet in fluid communication with a pressurized fluid supply and with the interior pneumatic chamber; and at least one outlet in fluid communication with the interior pneumatic chamber, wherein the at least one outlet faces an outlet direction;

expelling pressurized gas from the at least one outlet at sufficient force in the reinforcement zone to press unadhered portions of a label against an underlying package to which part of the label is adhered;

obtaining images of the packages at a location between the label applicator and the force applicator via an image sensor, wherein the image sensor is in electrical communication with a processor in electronic communication with computer memory, executing, by the processor, computer readable instructions stored in the computer memory, wherein the executing step comprises:

performing image recognition that identifies misapplied labels that are partially adhered to the associated packages;

calculating a time duration at which an associated package will traverse the reinforcement zone; and actuating the force applicator to expel the pressurized gas from the at least one outlet while the associated package is in the reinforcement zone.

14. The method of claim 13, wherein the force applicator is attached to a mount, and the method comprises positioning the mount to position the force applicator at a distance measured between the at least one outlet and the support surface in the outlet direction.

15. The method of claim 14, further comprising moving an actuator connected to the mount, thereby adjusting the distance.

16. The method of claim 13, wherein the at least one outlet comprises a plurality of outlets.

17. The method of claim 16, wherein the force applicator includes a plurality of valves positioned between the interior pneumatic chamber and the respective outlets, and the executing step comprises adjusting the valves independently for controlling a distribution of the pressurized gas expelled from the force applicator.

18. The method of claim 13, wherein the executing step comprises rotating the force applicator about an axis that is perpendicular to the conveyance direction, thereby adjusting a distribution of the pressurized gas expelled from the force applicator.

19. The method of claim 13, wherein:

the step of performing image recognition comprises identifying a type of label misapplication; and the step of actuating the force applicator comprises moving at least some of the outlets relative to the support surface responsive to the type of label misapplication identified, thereby adjusting a distribution of the pressurized gas expelled from the force applicator to reinforce the type of misapplied label.

* * * * *